Aug. 29, 1967 R. A. TIGNER 3,338,997
METHOD AND APPARATUS FOR FORMING PLASTIC CONTAINERS
Filed March 14, 1963 2 Sheets-Sheet 1
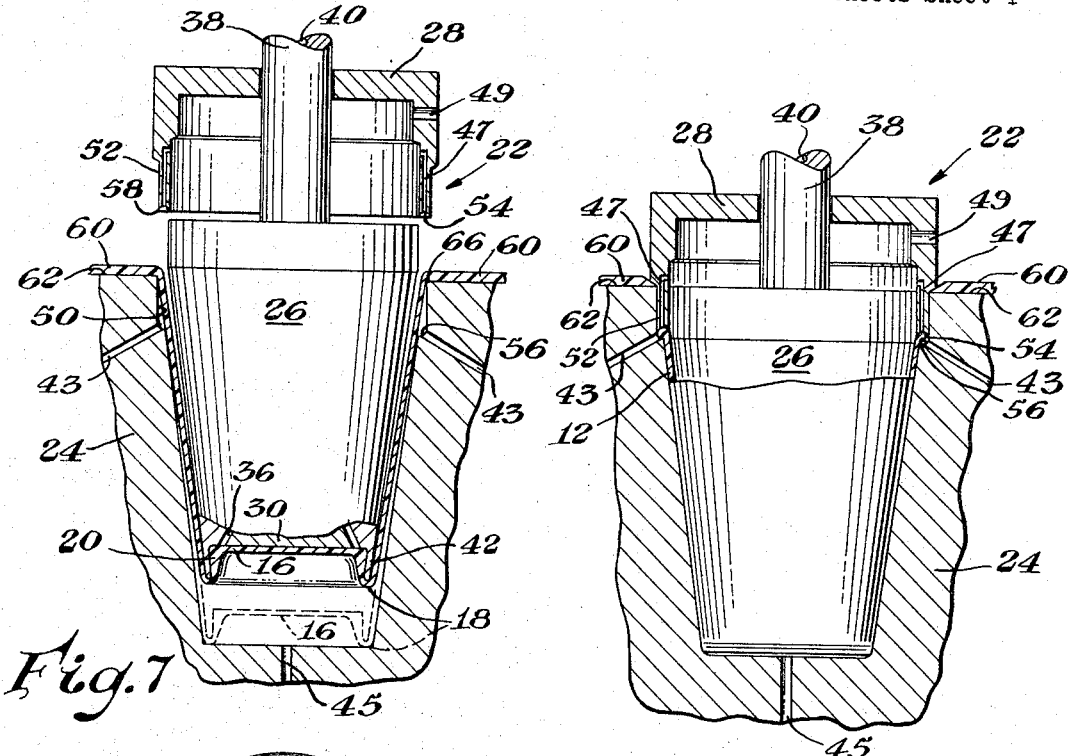
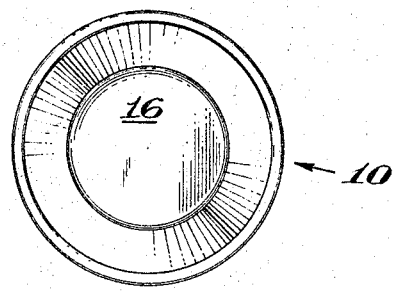
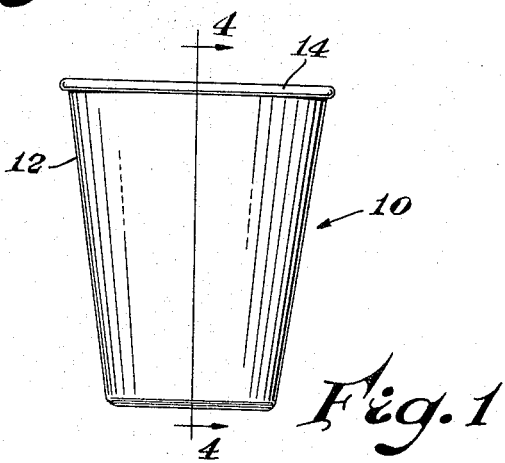
INVENTOR.
Ruben A. Tigner
BY
Lloyd L. Herrmann
ATTORNEY Aug. 29, 1967   R. A. TIGNER   3,338,997
METHOD AND APPARATUS FOR FORMING PLASTIC CONTAINERS
Filed March 14, 1963   2 Sheets-Sheet 2
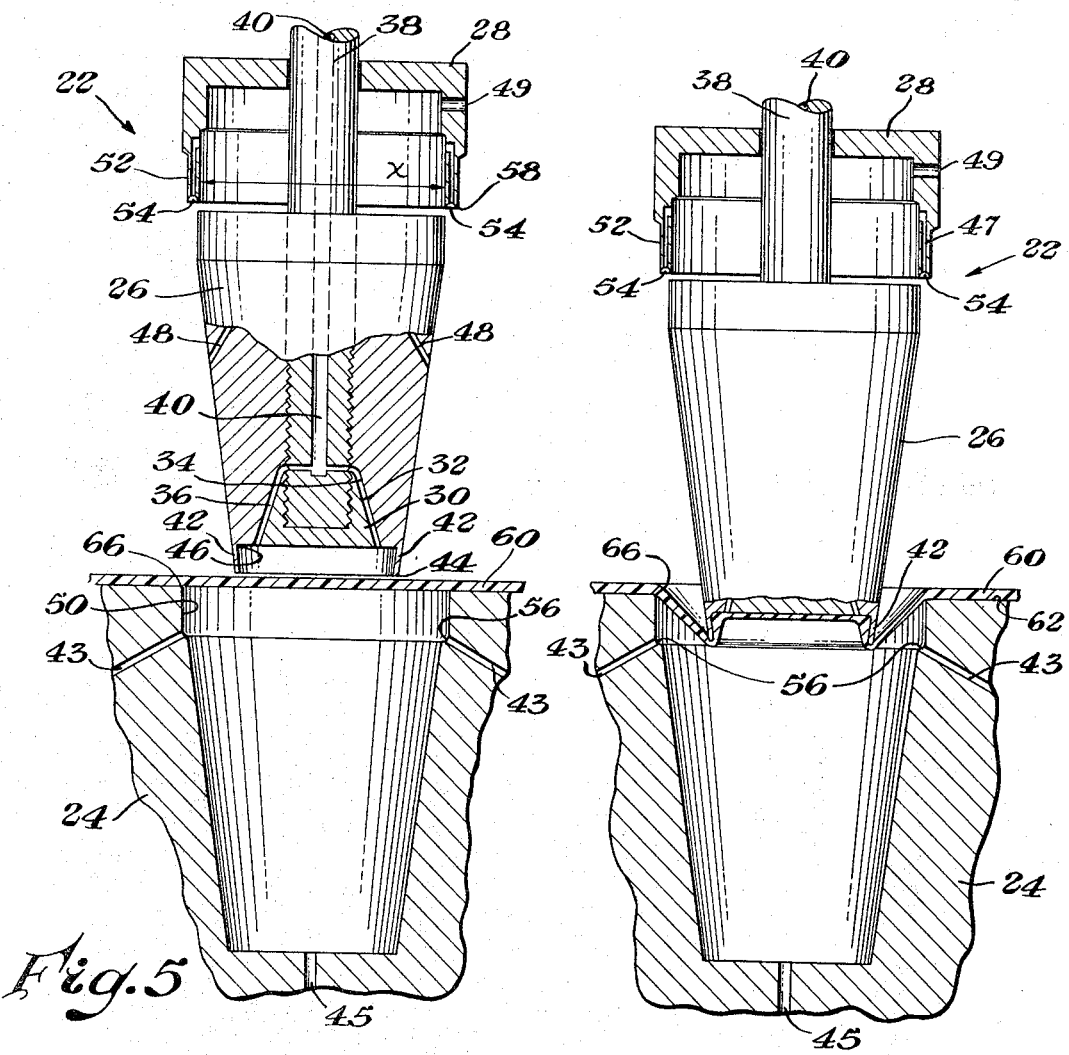
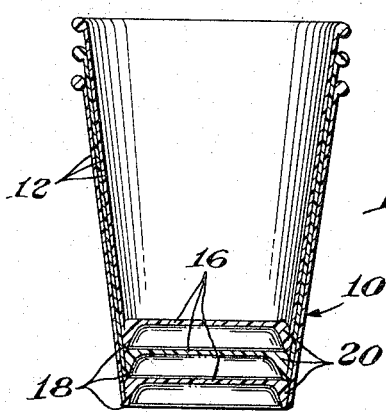
INVENTOR.
Ruben A. Tigner
BY
ATTORNEY

# United States Patent Office 3,338,997
Patented Aug. 29, 1967

3,338,997
METHOD AND APPARATUS FOR FORMING PLASTIC CONTAINERS
Ruben A. Tigner, Pinconning, Mich., assignor to The Dow Chemical Company, Midland, Mich., a corporation of Delaware
Filed Mar. 14, 1963, Ser. No. 265,219
9 Claims. (Cl. 264—89)

This invention relates generally to method and apparatus for forming plastic containers with false bottoms and bead-like lips and, more particularly, plastic foam containers with features especially adapted for vending machines.

While in the past it has been relatively simple to form plastic film containers with raised bottoms for purposes of rigidity, stacking and appearance, such simplicity of forming has not been present with plastic foam containers, such as cups, because of uneven flow and other unpredictable characteristics of foam. Since in the past it has been difficult to control side wall thickness of foam by an economical, vacuum forming technique, such cups previously have been generally avoided in vending machine use. Because of the prior necessity of employing matched dies to have some degree of control in forming from foam sheets and, further, because of the reverse pitch required for stacking shoulders in raised bottom cups which has been unobtainable in matched die forming, raised bottom foam cups previously have been impractical to manufacture by this method also. The novel vacuum forming plug die technique of this invention has eliminated that impracticability.

In addition, in the prior conventional method of forming containers from non-expanded plastic sheet, the bottom could only be formed after the sheet had been drawn into the bottom of the forming mold while, in the present invention, the bottom of the container can be formed first in the forming cycle or at any later time to gain the desired bottom characteristics. Any other physically acceptable technique, such as by foaming in place or by injection molding, has proven to be too expensive to be practical, the relative cost thereof being approximately ten times as great as that for producing expanded plastic containers according to the techniques of the present invention. Furthermore, prior teachings have not been able to provide for an efficient and effective enough bead-like lip on plastic foam containers to render them practical for vending machine operation.

A still further object of the present invention is to provide a novel vacuum and die forming process for the manufacture of plastic containers.

Still another object of the present invention is the provision of a novel technique for forming a raised bottom stackable container wherein the thickness of the side wall and especially the bottom wall thereof can be controlled by the use of vacuum.

And still another object of the present invention is the provision in forming apparatus, for plastic foam containers, of an integral mechanism for forming a bead-like lip about the periphery of the containers.

Briefly then, the present invention comprehends a novel method and apparatus for forming raised bottom plastic containers with a bead-like lip. The side walls of the container are inclined and extended beyond the actual bottom of the container such that the diameter of the periphery of the extension is less than that of the actual bottom thereof to provide for releasable nesting of a plurality of such containers within one another. Apparatus of this invention forms the above bottom configuration prior to completion of the forming of the side wall, employing single and double vacuum drawing in novel dies to provide a controlled bottom weight and thickness. The apparatus also provides for controlled side wall thickness. A crushing and vacuum technique for forming a desirable bead-like lip while the container is in its forming die is additionally provided.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which:

FIGURE 1 is an elevational view of a foamed plastic cup formed according to the principles of the present invention;

FIGURE 2 is a top view thereof;

FIGURE 3 is a bottom view thereof;

FIGURE 4 is a cross-sectional view of a plurality of cups like that of FIG. 1, in a stacked relationship, with the cross-section of each cup being as if taken along the reference line 4—4 of FIG. 1;

FIGURE 5 is a cross-sectional view of assembled apparatus of the present invention prior to the forming of a cup;

FIGURE 6 is a view similar to FIG. 5 only showing the apparatus in a subsequent step of forming the bottom wall of the cup;

FIGURE 7 is still another view like FIG. 5 only showing a subsequent step, to that shown in FIG. 6, of forming the side wall of the cup; and FIGURE 8 is yet another view like FIG. 5 only showing a final step of forming a bead-like lip for the cup.

Referring now more particularly to FIGS. 1 to 4, container 10 is shown, in an exemplary form, as a frusto-conically shaped cup preferably formed of a plastic foam, such as expanded polystyrene, it being understod that such containers can be formed of other adaptable foam or plastic film materials if so desired.

Since container 10 is particularly adapted for automatic vending machine dispensing, it includes, at the upper periphery of its sidewall 12, a bead-like lip 14 for engagement by fingers of a vending apparatus.

Container 10 also includes a raised bottom 16 extending somewhat inwardly from the bottom periphery of the container formed by the circular foot 18 such that the diameter, or other configuration if foot 18 is other than circular, is concentric with and smaller than the diameter or other configuration of raised bottom 16. This permits stacking of one container within the other, that is, the foot of an upper container resting upon the bottom of the next lower container, as illustrated in FIG. 4.

If container 10 is formed of plastic foam, it preferably includes a gusset portion 20 between foot 18 and the upper surface of the bottom 16, for purposes of rigidity. It is to be understood, however, that the size of the gusset is relatively immaterial, it serving the same function even if it formed a solid fill-in between the foot 18 and the bottom 16, provided economics permits the additional material to be used. It is noted that a plastic film cup (not shown) formed by the technique of this invention preferably does not include a similar gusset portion as found in the foam cup.

Referring now more particularly to FIG. 5, the apparatus 22, for forming a container 10, basically includes a female die mold 24, a male die or plug body 26 and a trimmer and rim former 28, with the apparatus being shown in its open state preliminary to forming a container. Associated with plug body 26 is a trapezoidal shaped insert member 30 having an upper periphery 32 substantially conforming to a portion of the bottom periphery 34 of the plug body 26 but spaced therefrom to provide an air passageway 36. Member 30 is held in this position by being secured to the lower end of a shaft 38 threadily engaged through plug body 26 which, in turn, is preferably slidably engaged at its upper end to former 28.

Passageway 36 is connected with an internal passageway 40 within shaft 38 through which a vacuum can be drawn or air introduced into the mold when desired. Other air passageways 48 can be employed from the side of plug body 26 for providing better control in forming and/or in removal of a formed container. Mold 24 can also be provided with air passageways 43 and 45, the use of which is described hereinafter. The use of passageways 47 and 49 of former 28 are also later described.

Plug body 26 includes a peripheral leg 42 with its inside surface substantially parallel to its outside surface. Leg 42 is formed of such a length, from the inclined side of the plug body, that the outer peripheral edge 44 of the plug body has a diameter less than the inner peripheral corner 46 of the body.

Trimmer and rim former 28 is constructed so as to be slidable up and down shaft 38, being controlled by a separate air cylinder than that which controls plug body 26 (neither air cylinder being shown), and whose internal hollow diameter X is just great enough so as to clear the outside external periphery of plug body 26, but small enough to seat about the upper portion of plug body 26 when engaged thereon. While former 28 can also be fixed to shaft 38 at a spaced distance above plug body 26 so that when the plug is fully lowered the former comes down the proper distance to perform simultaneously its bead forming function, later described, this has not been found preferable in practice although it is considered to be within the scope of the present invention.

Pocket 50 is provided within mold 24 about the periphery of the mold cavity for entry of projecting leg 52 of the former 28, the bottom of the leg 52 and the bottom of the pocket 50 being cooperatively and oppositely formed, reversely concave to one another, with radius curved surfaces 54 and 56. Outer edge 58 of leg 52 is formed sharp enough so as to cut through a plastic sheet and act as a trimmer.

In forming container 10, preferably a sheet 60 of plastic foam is placed across the top surface 62 of mold 24 and clamped (not shown) thereto, when plug 26 and former 28 are withdrawn therefrom. The sheet 60 engages top surface 62 in a heated condition and as the hot plastic sheet is plugged and stretched into forming cavity 64 of mold 24, as shown in FIG. 6, or just prior thereto, a reverse vacuum can be drawn through passageways 36 and 40 to form false bottom 16 thus providing the stacking feature of container 10. The exact timing of drawing the vacuum on the plug can be varied to obtain the desired sheet thickness of the raised bottom, that is, the further down the plug travels before a vacuum is drawn on the bottom wall, the thinner that wall will be. Thus, a desired bottom weight, once formed, maintains its shape and thickness despite the further forming of the side wall 12 of container 10 as the plug continues to descend, as illustrated in FIG. 7, to the bottom position shown in dotted lines. Former 28 does not continue all the way down the plug 26, but remains in an upper position until the step illustrated in FIG. 8, discussed hereinafter, is effected. Once the side wall 12 is formed, a reverse vacuum can be drawn through passageway 45 whereby the foam on the underside of the bottom 16 expands to form the gussets 20 and the bottom wall to any desired thickness since vacuum can be drawn on both sides of the raised bottom 16.

Once the side wall 12 and bottom 16 are formed, trimmer and former 28 descends, as shown in FIG. 8, shearing the upper periphery of the cup from sheet 60 with trimming edge 58 cutting against corner 66 of mold 24. After the trimmer shears the container from sheet 60, the leg 52 continues to descend, compressing the still heated foam between corresponding radiuses 54 and 56, to form bead-like lip 14. While an effective bead can be formed from no more than the above described action, a bead of a desired thickness and density can preferably be obtained by controlling a vacuum drawn through passageway 47 from curved surface 56, and thence out port 49, and a vacuum drawn on the reverse side of the bead-like lip 14 through passageway 43 from curved surface 54, out through mold 24. The opposite pulling effect of the two vacuums thus provides for a uniform cross-sectioned and full-shaped bead-like lip.

Thence the plug 26 and former 28 are withdrawn to the starting position shown in FIG. 5 wherein the finished cup or container 10 is ejected. This ejection can be obtained by blowing air through passageways 36, 40 and 48 of the plug body as it is being withdrawn from the mold cavity to release the cup therefrom, which still remains in the mold, and then blowing air into the mold cavity through passageways 43 and 45 to eject the cup. Another way to eject can be had by maintaining the vacuum through the plug body passageways 36, 40 and 48 while it is being withdrawn with the formed cup thereon, with air simultaneously being blown into the mold cavity through passageways 43 and 45 if desired, and then, when the plug body is fully withdrawn, releasing the vacuum and blowing air through passageways 36, 40 and 48 to release the cup from the plug body 26.

Accordingly, it can be seen that a well-controlled and formed cup body, including stacking features, a desired bottom weight, a controlled bead-like lip and a controlled wall thickness can be readily formed. While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method of forming a nestable frusto-conically shaped plastic container with a raised bottom and a side wall inclined outwardly from its bottom to top, said method comprising the steps of:
 (a) heating a plastic sheet to a formable temperature,
 (b) placing said sheet under a male die having a recessed bottom and a peripheral leg portion following the angular inclination of said side wall,
 (c) drawing a vacuum from between said sheet and said leg portion to form said bottom into reverse angular configuration about said leg portion,
 (d) and advancing said male die into a mold cavity to subsequently complete forming of the container.

2. A method of forming a nestable frusto-conically shaped plastic foam container with a raised bottom and a side wall inclined outwardly from its bottom to top, said method comprising the steps of:
 (a) heating a plastic sheet to a formable temperature,
 (b) placing said sheet under a male die having a recessed bottom and a peripheral leg portion following the angular inclination of said side wall,
 (c) drawing a vacuum from between said sheet and said leg portion to form said bottom into reverse angular configuration about said leg portion,
 (d) advancing said male die into a mold cavity to complete formation of the containers side wall,
 (e) and drawing a vacuum from between said sheet and the bottom of said cavity simultaneously with and in a direction generally opposite to said first-mentioned vacuum.

3. A method of forming a container from a plastic foam sheet, said method comprising the steps of:
 (a) heating said sheet to a formable temperature,
 (b) clamping said heated sheet between a plug body and a mold cavity,
 (c) plugging said sheet into said cavity,
 (d) separating the upper periphery of said container from said sheet, (e) compressing said upper periphery a given distance between complementary surfaces to form a bead-like lip, and (f) simultaneously with said compressing drawing a vacuum from each of said surfaces to provide a lip of uniform shape and density.

4. A method of forming a nestable frusto-conically shaped container from plastic foam sheet, said method comprising the steps of:

(a) heating said sheet to a formable temperature, (b) clamping said heated sheet between a plug body and a mold cavity, said plug body having a recessed body and a peripheral leg portion, (c) plugging said sheet into said cavity, (d) drawing a vacuum from between said sheet and said leg portion at least at a time prior to the completion of said plugging, (e) separating the upper periphery of said container from said sheet as said plugging is being completed, (f) compressing said upper periphery between complementary surfaces to form a bead-like lip, and (g) drawing a vacuum from between said sheet and the bottom of said cavity simultaneously with and in a direction generally opposite to said first-mentioned vacuum.

5. Apparatus for forming raised bottom nestable containers, said apparatus comprising a female mold having a generally frusto-conically shaped cavity, a plug body having a generally frusto-conically shaped body substantially complementary to said cavity and adapted to enter thereinto and remain spaced therefrom, an entry end of said plug body having a central recess defining a peripheral leg portion, means for creating a fluid pressure differential at said recess, an outer peripheral edge of said leg portion having a configuration substantially concentric with and of a size less than the greatest configuration of said recess, whereby said apparatus forms containers which are releasably nestable in one another with the other lower periphery of one such container resting upon the upper surface of the bottom of the next lower container.

6. Apparatus for forming raised bottom nestable containers, said apparatus comprising a female mold having a generally frusto-conically shaped cavity, a plug body having a generally frusto-conically shaped body substantially complementary to said cavity and adapted to enter thereinto and remain spaced therefrom, an entry end of said plug body having a central recess defining a peripheral leg portion, an outer peripheral edge of said leg portion having a configuration substantially concentric with and of a size less than the innermost configuration of said recess, said plug body including an air passageway from said recess for drawing a vacuum and for blowing ejection air therethrough, whereby said apparatus forms containers which are releasably nestable in one another with the lower periphery of one such container resting upon the upper surface of the bottom of the next lower container.

7. Apparatus for forming raised bottom nestable containers, said apparatus comprising a female mold having a generally frusto-conically shaped cavity, a plug body having a generally frusto-conically shaped body substantially complementary to said cavity and adapted to enter thereinto and remain spaced therefrom, an entry end of said plug body having a central recess defining a peripheral leg portion, an outer peripheral edge of said leg portion having a configuration substantially concentric with and of a size less than the innermost configuration of said recess, said plug body including an air passageway from said recess, said mold including another air passageway from the end of said cavity, said passageways adapted for drawing generally opposed vacuums and for emitting ejection air therethrough, whereby said apparatus forms containers which are releasably nestable in one another with the lower periphery of one such container resting upon the upper surface of the bottom of the next lower container.

8. Apparatus for forming raised bottom nestable plastic foam containers with a bead-like lip, said apparatus comprising a female mold having a generally frusto-conically shaped cavity, a plug body having a generally frusto-conically shaped body substantially complementary to said cavity and adapted to enter thereinto and remain spaced therefrom, an entry end of said plug body having a central recess forming a peripheral leg portion, an outer peripheral edge of said leg portion having a configuration substantially concentric with and of a size less than the innermost configuration of said recess, said plug body including an air passageway from said recess, said mold including an air passageway from the end of said cavity, said aforementioned passageways adapted for drawing a vacuum and emitting ejection air therethrough, a trimmer and rim former having a peripheral leg portion extending toward said mold, means for actuating said plug body and said former toward and into a portion of said cavity, said mold including adjacent its outer peripheral corner a pocket presenting an outwardly extending concave surface, said leg portion having an outer edge adapted to pass closely adjacent said corner so as to cut materials therebetween and having a concave surface at its outer extent adapted to complement and oppose said first-mentioned concave surface, said mold and said former each including an air passageway from its respective concave surface for drawing a vacuum in generally opposite directions as a bead-like lip is being formed therebetween, whereby said apparatus forms containers which are releasably nestable in one another with the lower periphery of one such container resting upon the upper surface of the bottom of the next lower container.

9. Apparatus for forming raised bottom nestable containers, said apparatus comprising a female mold having a generally frusto-conically shaped cavity, a plug body having a generally frusto-conically shaped body substantially complementary to said cavity and adapted to enter thereinto and remain spaced therefrom, an entry end of said plug body having a central recess defining a peripheral leg portion, means for creating a fluid pressure differential at said recess, said recess defining an inner peripheral corner of said body, said leg having an outer peripheral edge, said corner defining a circle and said edge defining a circle, the diameter of said edge being smaller than but concentric with that of said corner, whereby said apparatus forms containers which are releasably nestable in one another with the lower periphery of one such container resting upon the upper surface of the bottom of the next lower container.

References Cited

UNITED STATES PATENTS

| | | | |
|---|---|---|---|
| 1,122,393 | 12/1914 | House. | |
| 2,805,790 | 9/1957 | Smucker | 220—97 |
| 2,891,280 | 6/1959 | Politis | 18—19 |
| 2,985,914 | 5/1961 | Miller | 18—19 |
| 2,990,581 | 7/1961 | Rowe | 264—89 |
| 3,011,212 | 12/1961 | Marshall et al. | 264—90 |
| 3,015,851 | 1/1962 | Wiles | 264—53 |
| 3,054,144 | 9/1962 | Goodwin et al. | 264—295 XR |
| 3,059,810 | 10/1962 | Edwards | 220—97 |
| 3,083,734 | 4/1963 | Taplin | 264—324 XR |
| 3,068,248 | 4/1963 | Culp | 264—53 |
| 3,159,693 | 12/1964 | Plymale | 264—53 |
| 3,173,174 | 3/1965 | Edwards | 264—294 XR |
| 3,218,379 | 11/1965 | Edwards | 264—93 |

ROBERT F. WHITE, *Primary Examiner.*

EARLE J. DRUMMOND, *Examiner.*

G. E. LOWRANCE, M. R. DOWLING, A. R. NOE, *Assistant Examiners.*